United States Patent
Sasaki

(10) Patent No.: US 11,433,606 B2
(45) Date of Patent: Sep. 6, 2022

(54) THREE-DIMENSIONAL SHAPE PROCESSING METHOD

(71) Applicant: OKUMA CORPORATION, Niwa-Gun (JP)

(72) Inventor: Ryosuke Sasaki, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 77 days.

(21) Appl. No.: 16/842,978

(22) Filed: Apr. 8, 2020

(65) Prior Publication Data

US 2020/0338820 A1    Oct. 29, 2020

(30) Foreign Application Priority Data

Apr. 23, 2019 (JP) .............................. JP2019-082154

(51) Int. Cl.
*B29C 64/188* (2017.01)
*B33Y 10/00* (2015.01)

(52) U.S. Cl.
CPC ............. *B29C 64/188* (2017.08); *B33Y 10/00* (2014.12)

(58) Field of Classification Search
CPC .... B29C 69/001; B29C 64/112; B29C 64/118
See application file for complete search history.

(56) References Cited

U.S. PATENT DOCUMENTS 9,833,986 B1 * 12/2017 Susnjara ............... B29C 64/124
2016/0311022 A1 * 10/2016 Krebs ....................... B22F 3/24

FOREIGN PATENT DOCUMENTS

JP    2010-280173 A1    12/2010
JP    2018-012336 A1    1/2018

* cited by examiner

*Primary Examiner* — Alex A Rolland
(74) *Attorney, Agent, or Firm* — Burr & Brown, PLLC

(57) ABSTRACT

A three-dimensional shape processing method processes a workpiece into a predetermined three-dimensional shape by cutting work and additive manufacturing. The method includes forming a target surface for the additive manufacturing to be larger than a shape dimension of the three-dimensional shape, performing the additive manufacturing on the target surface that has been largely formed, and performing the cutting work on a region where the additive manufacturing has been performed to complete the three-dimensional shape.

3 Claims, 5 Drawing Sheets

THREE-DIMENSIONAL SHAPE PROCESSING METHOD

BACKGROUND OF THE INVENTION

This application claims the benefit of Japanese Patent Application Number 2019-082154 filed on Apr. 23, 2019, the entirety of which is incorporated by reference.

FIELD OF THE INVENTION

The disclosure relates to a method for processing a three-dimensional shaped product using a cutting work and an additive manufacturing.

DESCRIPTION OF RELATED ART

There has been conventionally known a three-dimensional shape processing technique that combines a cutting work technique and an additive manufacturing technique to provide a high degree of freedom of shape and satisfactory shape accuracy (for example, see Japanese Patent Application Publication No. 2010-280173). JP-A-2010-280173 discloses a technique that combines a powder bed type additive manufacturing and a cutting work to cut and remove a surface of a shaped object during shaping to improve shape accuracy.

Japanese Patent Application Publication No. 2018-12336 discloses a technique that combines a material injection type additive manufacturing and a cutting work to reduce surface roughness of a shaped object.

However, when the additive manufacturing is performed on a cutting work surface by the above-described techniques, in a case where finishing processing in the cutting work is necessary, a machining allowance is not possibly secured. Because of a property of the additive manufacturing, when an object has been shaped into an overhang shape, a volume of the object may be insufficient. Additionally, increase in number of lamination may cause a tapered shape.

Therefore, the disclosure has been invented to solve the above-described problems. An object of the disclosure is to provide a three-dimensional shape processing method that ensures manufacturing a three-dimensional shaped product having a satisfactory shape even when a cutting work and additive manufacturing are combined.

SUMMARY OF THE INVENTION

In order to achieve the above-described object, a three-dimensional shape processing method according to a first aspect of the disclosure is provided. The three-dimensional shape processing method processes a workpiece into a predetermined three-dimensional shape by cutting work and additive manufacturing. The method includes forming a target surface for the additive manufacturing to be larger than a shape dimension of the three-dimensional shape, performing the additive manufacturing on the target surface that has been largely formed, and performing the cutting work on a region where the additive manufacturing has been performed to complete the three-dimensional shape.

According to a second aspect of the disclosure, which is in the first aspect of the disclosure, in the case of forming the target surface largely, one or more beads are formed on an edge portion of the target surface by the additive manufacturing to enlarge the target surface.

According to a third aspect of the disclosure, which is in the first aspect or the second aspect of the disclosure, in the case of forming the target surface largely, the cutting work is performed on the target surface to enlarge the target surface.

With the disclosure, the target surface for the additive manufacturing is largely formed and the additive manufacturing is performed. Accordingly, a machining allowance of a boundary surface between the cutting work region and the additive manufacturing region and a machining allowance of the additive manufacturing region can be ensured, and the three-dimensional shaped product having the satisfactory shape can be manufactured. Additionally, since the processing can be performed with the minimum machining allowances, its productivity is improved.

BRIEF DESCRIPTION OF THE DRAWINGS

FIG. 4A illustrates a workpiece to be processed with cutting work, which is shown by solid lines, and a lower portion of a three-dimensional shaped product to be manufactured, which is shown by dashed lines.

FIG. 4B illustrates a state where the lower portion lower than a boundary surface between a cutting work region and an additive manufacturing region is formed by the cutting work.

FIG. 4C illustrates a state where a lamination-started surface is largely formed on an edge portion of the boundary surface by the additive manufacturing or the cutting work.

FIG. 4D illustrates a state where the additive manufacturing is performed on the lamination-started surface.

FIG. 4E illustrates a state where the cutting work is performed on the boundary surface to complete the three-dimensional shaped product.

DETAILED DESCRIPTION OF THE INVENTION

The following describes embodiments of the disclosure based on the drawings.

Figure 1:
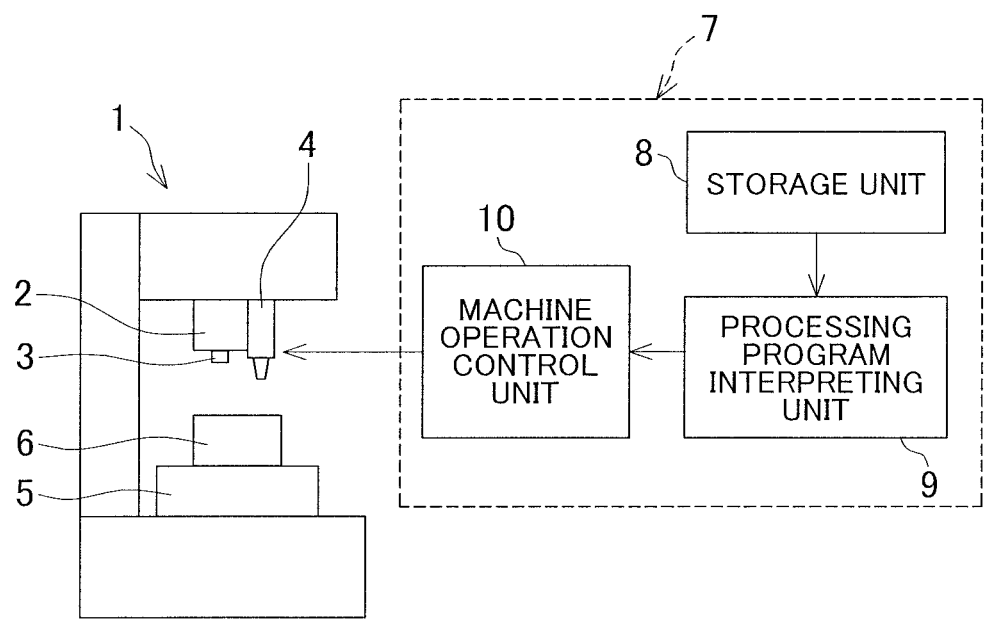
FIG. 1 is a schematic diagram of a three-dimensional shape processing device.

FIG. 1 illustrates a schematic diagram illustrating an example of a configuration of a three-dimensional shape processing device that performs a three-dimensional shape processing method according to the disclosure.

A three-dimensional shape processing device 1 includes a cutting work main spindle 2, a cutting tool 3, an additive manufacturing unit 4, a table 5 that fixes a workpiece 6, and an NC device 7.

The NC device 7 includes a storage unit 8 that stores a processing program, a processing program interpreting unit 9, and a machine operation control unit 10.

The processing program stored in the storage unit 8 is converted into a machine operation by the processing program interpreting unit 9. While the cutting work main spindle 2, the additive manufacturing unit 4, and the table 5 to which the workpiece 6 is fixed are caused to operate via the machine operation control unit 10, a cutting work with the cutting tool 3 and additive manufacturing by the additive manufacturing unit 4 are performed to manufacture a predetermined three-dimensional shaped product. The additive manufacturing unit 4 has a well-known structure, such as one irradiating supplied material powder with light beam to solidify the material powder.

Figure 2:
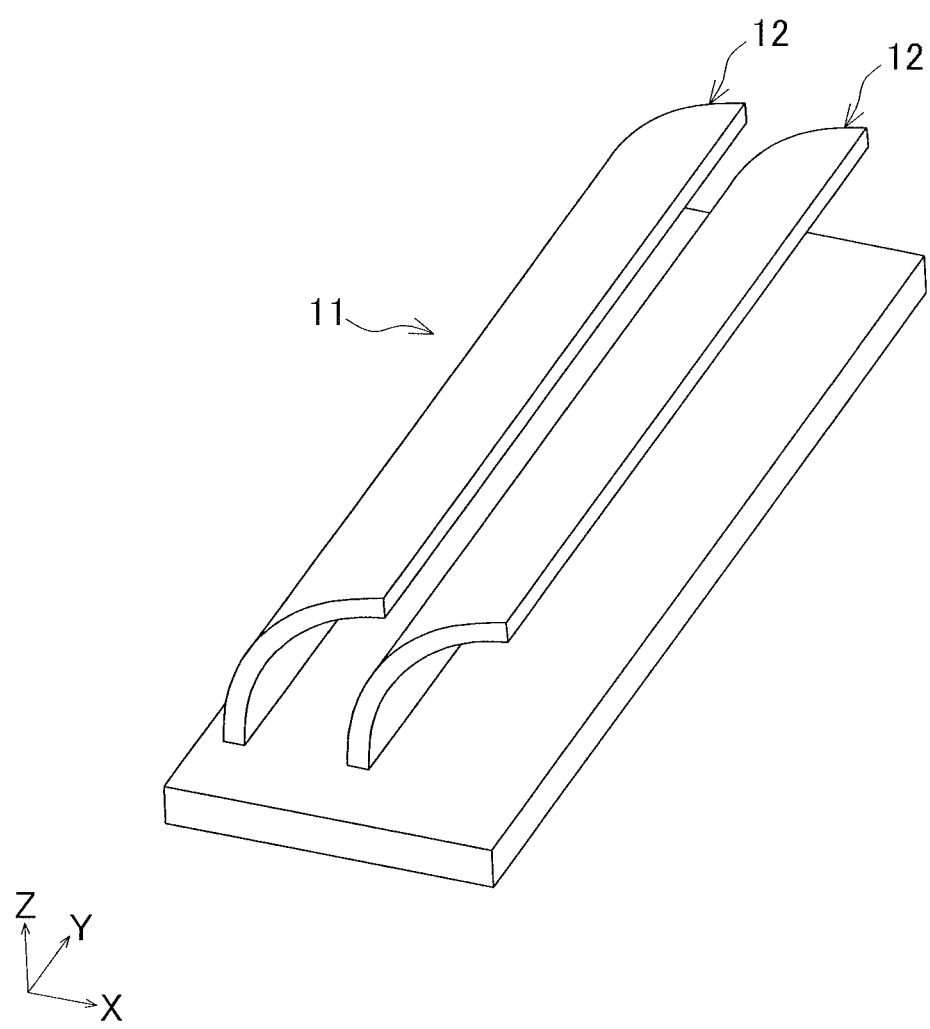
FIG. 2 is a perspective view of a three-dimensional shaped product.
Figure 3A:
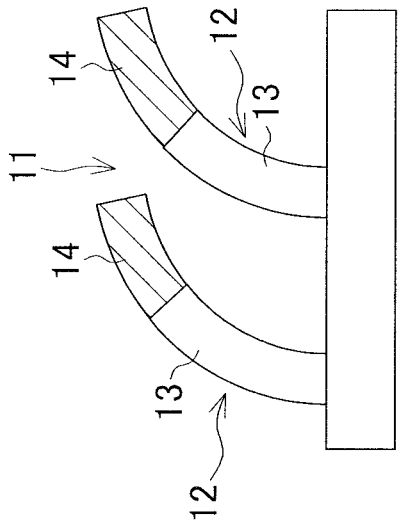
FIG. 3A illustrates a three-dimensional shaped product manufactured by cutting work.
Figure 3B:
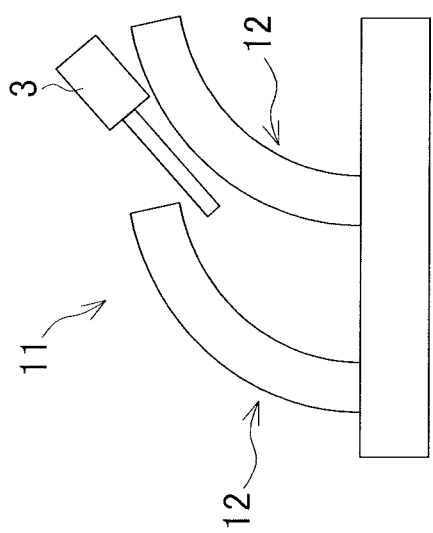
FIG. 3B illustrates a three-dimensional shaped product manufactured by cutting work and additive manufacturing.

FIG. 2 illustrates an example of a three-dimensional shaped product that can be manufactured by the three-dimensional shape processing device 1. As illustrated in FIG. 3A as well, in a three-dimensional shaped product 11, protrusions 12, 12, which project while curving in the Z direction, are arranged side by side with a predetermined interval in the X direction. Accordingly, since the cutting tool 3 interferes between the protrusions 12, 12, the three-dimensional shaped product 11 cannot be manufactured only by cutting work. Accordingly, as illustrated in FIG. 3B, the three-dimensional shaped product 11 is manufactured by combination of cutting work regions 13 formed by cutting work and additive manufacturing regions 14 (indicated by hatching) formed by additive manufacturing. The following describes the manufacturing procedure.

Figure 4A:
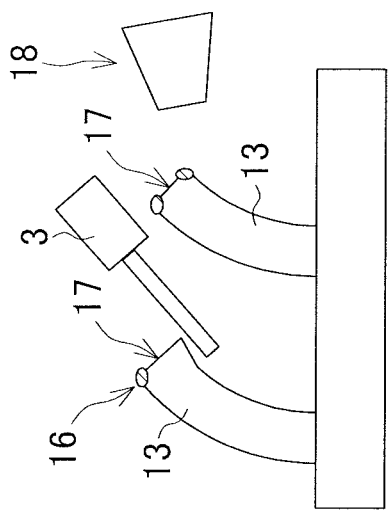
FIGS. 4A to 4E are explanatory views illustrating a procedure for a three-dimensional shape processing method.
Figure 4B:
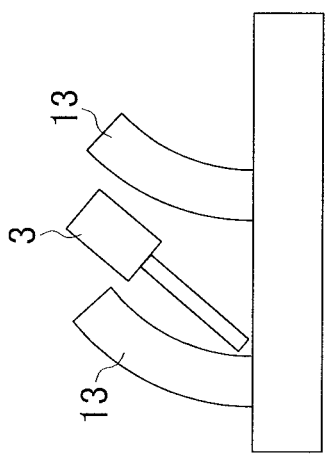

First, the cutting work is performed on the workpiece 6 illustrated in FIG. 4A with the cutting tool 3 to form a lower portion of a processing shape as illustrated in FIG. 4B. Here, the processing is performed on a lower portion lower than a boundary surface between the cutting work region 13 and the additive manufacturing region 14 up to a shape dimension. Note that while in the configuration, the lower portion of the processing shape is processed by cutting work, the lower portion may be preliminarily formed using another metal processing method (such as casting and forging).

Figure 4C:
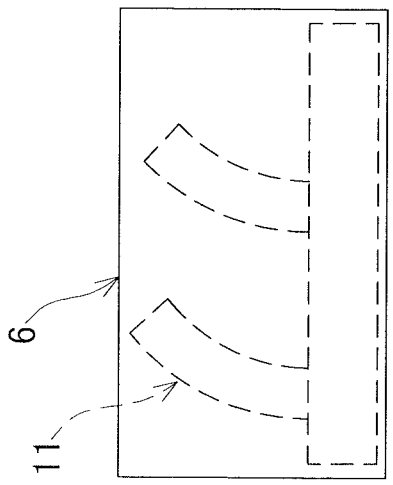

Subsequently, as illustrated in FIG. 4C, a lamination-started surface 17 larger than the shape dimension is formed on an edge portion of the boundary surface between the cutting work region 13 and the additive manufacturing region 14 by additive manufacturing or cutting work.

Figure 5A:
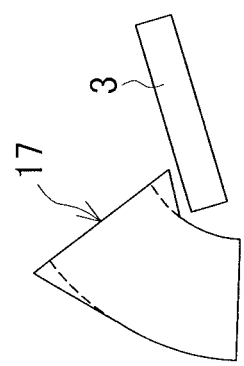
FIG. 5A is an enlarged view of the lamination-started surface in a case of the additive manufacturing.
Figure 5B:
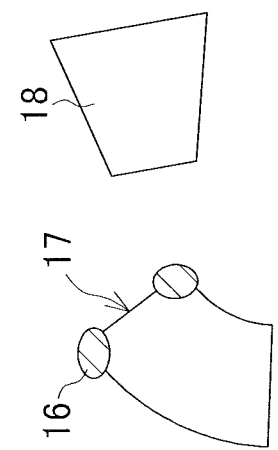
FIG. 5B is an enlarged view of the lamination-started surface in a case of the cutting work.

FIG. 5A and FIG. 5B are enlarged views of the lamination-started surface 17. To form the lamination-started surface 17 by additive manufacturing, as in FIG. 5A, beads 16 are formed on the edge portions of the boundary surface such that the lamination-started surface 17 becomes larger than the shape dimension. In the case, the additive manufacturing is performed on the lamination-started surface 17 by inclining an additive manufacturing processing head 18 of the additive manufacturing unit 4, so that the beads 16 are efficiently formed on the edge portions to form the lamination-started surface 17 larger than the shape dimension.

Meanwhile, to form the lamination-started surface 17 by cutting work, as in FIG. 5B, the cutting work is performed on the workpiece 6 with the cutting tool 3 such that the edge portions of the boundary surface become larger than the shape dimension. Thus, the lamination-started surface 17 is produced larger than the shape dimension.

As described above, the machining allowance of the boundary surface between the cutting work region 13 and the additive manufacturing region 14 can be sufficiently ensured. Although enlarging whole circumferences of the edge portions of the boundary surface ensures obtaining uniform machining allowance, the edge portions need not be enlarged regarding a surface that needs not be finished by cutting work from an aspect of function. The lamination-started surface 17 may be formed in combination of the cutting work and the additive manufacturing.

Figure 4D:
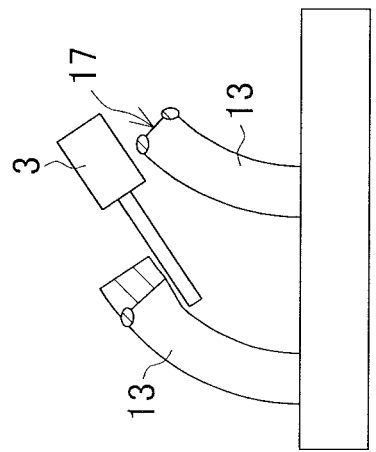

Subsequently, the additive manufacturing region 14 is additively manufactured from the lamination-started surface 17, which has the large shape dimension, thus forming an upper portion of the processing shape. Then, in a case where the cutting tool 3 interferes when the cutting work is performed on the additive manufacturing region 14 and the lamination-started surface 17, as illustrated in FIG. 4D, the processing is switched to the cutting work in the middle and the additive manufacturing is performed while avoiding the interference. Since the lamination-started surface 17 is largely formed, the additive manufacturing is performed such that the additive manufacturing region 14 becomes larger than the shape dimension. Accordingly, the machining allowance in the finishing processing by cutting is easily ensured.

Figure 4E:
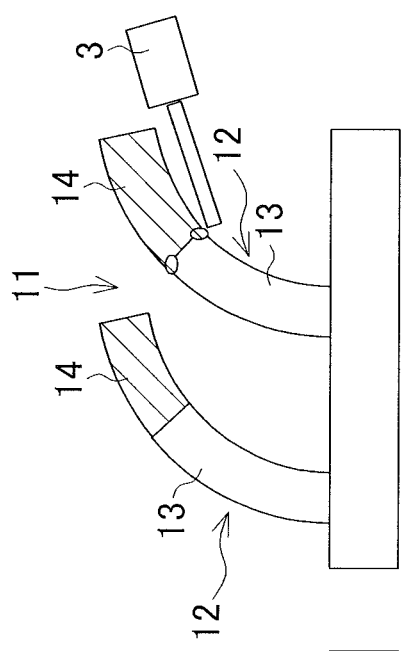

Finally, as illustrated in FIG. 4E, the cutting work is performed on the boundary surface between the surface of the additive manufacturing region 14 and the cutting work region 13 with the cutting tool 3 to complete the three-dimensional shaped product 11.

In the above-mentioned configuration, the three-dimensional shape processing method performs forming the lamination-started surface 17 (target surface for additive manufacturing) to be larger than the shape dimension of the three-dimensional shape (FIG. 4C), performing the additive manufacturing on the lamination-started surface 17 that has been largely formed (FIG. 4D), and performing the cutting work on the additive manufacturing region 14 to complete the three-dimensional shape (FIG. 4E). Accordingly, the machining allowance of the boundary surface between the cutting work region 13 and the additive manufacturing region 14 and the machining allowance of the additive manufacturing region 14 can be ensured, thereby ensuring manufacturing the three-dimensional shaped product 11 having a satisfactory shape. Additionally, since the processing can be performed with the minimum machining allowances, productivity is improved.

While the above-described processing method has been described using one three-dimensional shape processing device, the processing method of the disclosure may be performed by the use of different devices for cutting work and additive manufacturing. Obviously, the three-dimensional shaped product is not limited to the above-described configuration.

In the configuration, the description has been given with the boundary surface between the cutting work region and the additive manufacturing region as the lamination-started surface (target surface for additive manufacturing). However, there is no problem when the disclosure is carried out with a surface on which the cutting work has been performed in the additive manufacturing region and a surface in the middle of additive manufacturing as the target surface for additive manufacturing.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A three-dimensional shape processing method that processes a workpiece into a predetermined three-dimensional shape by cutting work and additive manufacturing, the method comprising the steps of:

forming a target surface for the additive manufacturing to be larger than a shape dimension of the three-dimensional shape;

performing the additive manufacturing on the target surface that has been largely formed; and performing the cutting work on a region where the target surface that has been largely formed and an excessive portion of the additive manufacturing that has been performed to complete the three-dimensional shape, wherein the additive manufacturing on the target surface is formed to be larger than a shape dimension of the three-dimensional shape by forming one or more beads on an edge portion of the target surface by the additive manufacturing to enlarge the target surface, and then the additive manufacturing is performed three-dimensionally so that an allowance for the edge portion is secured.

2. A three-dimensional shape processing method that processes a workpiece into a predetermined three-dimensional shape by cutting work and additive manufacturing, the method comprising the steps of:

forming a target surface for the additive manufacturing to be larger than a shape dimension of the three-dimensional shape;

performing the additive manufacturing on the target surface that has been largely formed; and performing the cutting work on a region where the target surface that has been largely formed and an excessive portion of the additive manufacturing that has been performed to complete the three-dimensional shape, wherein the target surface for the additive manufacturing is formed to be larger than a shape dimension of the three-dimensional shape by cutting a work material of the workpiece, which has a size larger than the three-dimensional shape, so that a vicinity of the target surface has a size larger than the three-dimensional shape dimension.

3. The three-dimensional shape processing method according to claim 1, wherein the target surface for the additive manufacturing is formed to be larger than a shape dimension of the three-dimensional shape by cutting a work material of the workpiece, which has a size larger than the three-dimensional shape, so that a vicinity of the target surface has a size larger than the three-dimensional shape dimension.

* * * * *